United States Patent [19]

Barényi et al.

[11] 4,029,353

[45] June 14, 1977

[54] MOTOR VEHICLE, ESPECIALLY PASSENGER MOTOR VEHICLE WITH AT LEAST ONE DOOR ON EACH SIDE

[75] Inventors: Béla Barényi, Maichingen; Heinrich Haselmann, Sindelfingen; Egon Rieth, Boblingen, all of Germany

[73] Assignee: Daimler-Benz Aktiengesellschaft, Germany

[22] Filed: Mar. 26, 1975

[21] Appl. No.: 562,096

[30] Foreign Application Priority Data

Mar. 30, 1974 Germany ........................ 2415534

[52] U.S. Cl. ...................... 296/28 R; 49/488; 296/146
[51] Int. Cl.² ............................................ B60J 5/04
[58] Field of Search ............... 296/146, 151, 28 R, 296/28 F, 28 H; 49/489, 490, 491, 496, 488

[56] References Cited

UNITED STATES PATENTS

| | | | |
|---|---|---|---|
| 2,312,812 | 3/1943 | Geyer | 296/151 |
| 3,535,824 | 10/1970 | Kessler | 49/489 X |
| 3,633,316 | 1/1972 | Belser | 49/489 X |
| 3,713,690 | 1/1973 | Knothe et al. | 296/146 |
| 3,726,559 | 4/1973 | Wilfert | 296/146 X |
| 3,788,008 | 1/1974 | Yackiw et al | 49/496 |

*Primary Examiner*—Robert J. Spar
*Assistant Examiner*—Donald W. Underwood
*Attorney, Agent, or Firm*—Craig & Antonelli

[57] ABSTRACT

A motor vehicle, especially a passenger motor vehicle with at least one door on each vehicle side which is inserted into a door opening that is delimited at the bottom by a longitudinal bearer; a guard member is thereby mounted at the door which covers the longitudinal bearer at least in its upper area when the door is closed and which then abuts at the longitudinal bearer with its edges.

11 Claims, 4 Drawing Figures

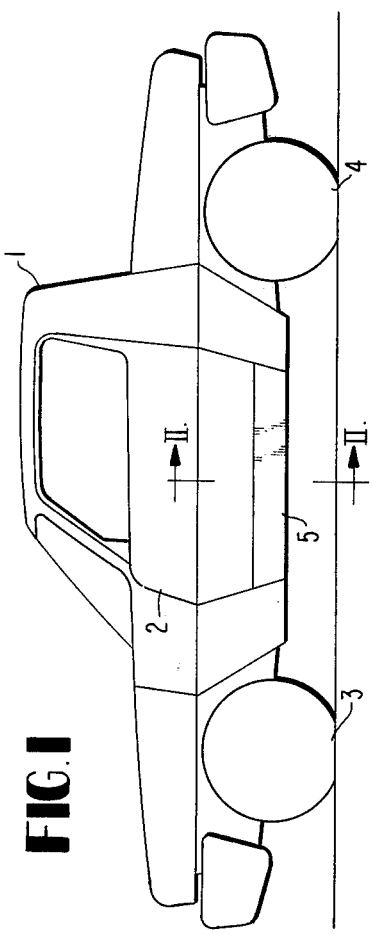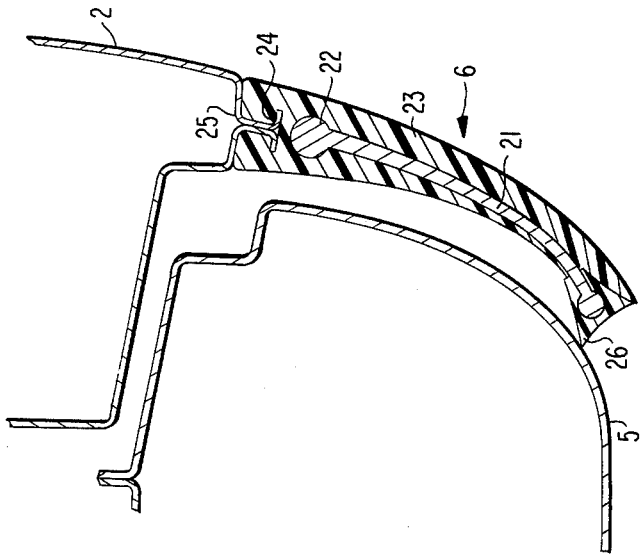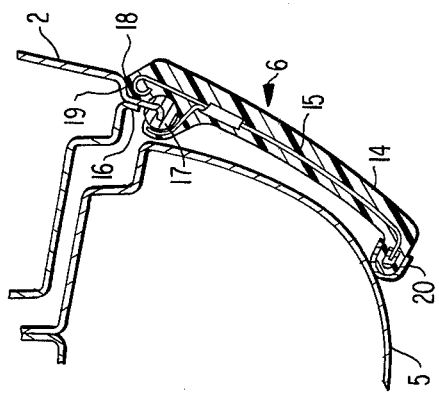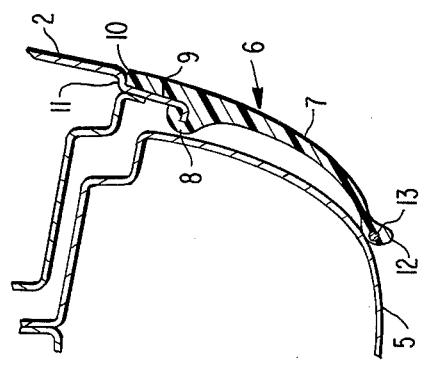

MOTOR VEHICLE, ESPECIALLY PASSENGER MOTOR VEHICLE WITH AT LEAST ONE DOOR ON EACH SIDE

The present invention relates to a motor vehicle, especially to a passenger motor vehicle, with at least one door on each vehicle side which is inserted into a door opening that is delimited in the downward direction by a longitudinal bearer.

The longitudinal bearers forming the lower boundary of the door cutout or opening are located within an area which in a motor vehicle, especially in a passenger motor vehicle, is exposed to quite considerable soilings during normal driving operation. There exists the danger that a person boarding the vehicle contacts this longitudinal bearer with a piece of his or her clothing which can be considerably dirtied or soiled as a result thereof. This danger is large in particular with vehicles in which the seats are arranged relatively deep in the vehicle and/or the longitudinal bearers are disposed far apart.

The aim of the present invention resides in so constructing a motor vehicle of the aforementioned type that the soiling of the longitudinal bearers within the area of the door openings is at least reduced so that the danger of soiling or dirtying pieces of clothing of a person boarding or leaving the vehicle is prevented as much as possible.

The present invention resides in that a guard or shield is mounted at the door which covers the longitudinal bearer with a closed door at least within its upper area and which abuts with its edges at the longitudinal bearers. It is achieved thereby that in normal operation, the area of the longitudinal bearer is covered off and protected against soiling, with which a person might come into contact with his clothing during the boarding.

In one advantageous embodiment of the present invention, it is proposed that the shield is pivotally mounted at the lower edge of the door and is stressed with a spring force in the direction toward the longitudinal bearer. It is achieved by this measure that the shield abuts sealingly at the longitudinal bearer and thus the penetration or entry of dirt is prevented. Additionally, the danger is avoided that the shield abuts only loosely at the longitudinal bearer and is cause for a rattling driving noise.

The same purpose is achieved in that in another embodiment of the present invention the shield consists of an elastic plate to be deformed during the closing of the door. In this case, it is advantageous if the shield is equipped with reinforcing inserts which consist preferably of spring material.

In a still further embodiment, provision is made according to the present invention that a plate serves as shield which is surrounded with an elastic profile which abuts with its lower edge at the longitudinal bearer when the door is closed. It is thereby advantageous if the elastic profile stresses the plate with a prestress force toward the longitudinal bearer.

In an appropriate construction of the present invention, provision is made that the longitudinal bearer is arranged set back with respect to the contour of the door which is continued by the shield. In this manner, the shield is harmonically incorporated into the overall configuration of the vehicle.

Accordingly, it is an object of the present invention to provide a motor vehicle, especially a passenger motor vehicle with at least one door on each side which avoids by simple means the aforementioned shortcomings and drawbacks encountered in the prior art.

Another object of the present invention resides in a passenger motor vehicle with at least one door on each side, in which the danger of soiling the longitudinal bearer delimiting the door opening at the bottom thereof is at least greatly reduced.

A further object of the present invention resides in a passenger motor vehicle in which the danger of soiling the clothing of the vehicle passengers, which come in contact with the longitudinal bearer within the area of the door opening during the boarding and leaving of the vehicle, is greatly reduced by extremely simple means.

A still further object of the present invention resides in an effective soil protection means for the longitudinal bearers within the area of the door opening of a passenger motor vehicle, which is simple in construction and easy to install.

Still another object of the present invention resides in a passenger motor vehicle of the aforementioned type in which a shield member is provided along the lower edge of the door which shields the longitudinal bearer within the area of the door opening when the door is closed.

These and further objects, features and advantages of the present invention will become more apparent from the following description when taken in connection with the accompanying drawing which shows, for purposes of illustration only, several embodiments in accordance with the present invention, and wherein:

FIG. 1 is a schematic side elevational view of a passenger motor vehicle constructed in accordance with the present invention; and FIGS. 2a, 2b and 2c are cross-sectional views, taken along line II—II of FIG. 1 through different embodiments of a longitudinal bearer protection in accordance with the present invention.

Referring now to the drawing wherein like reference numerals are used throughout the various views to designate like parts, the passenger motor vehicle 1 illustrated in FIG. 1 includes on each side of the vehicle, a door 2 which is fitted into a door opening or cutout. The door opening is delimited on all sides by parts of the body and of the framework. A longitudinal bearer 5 extending approximately in the plane of the front wheels 3 and of the rear wheels 4 serves as lower boundary, which is illustrated partly in cross section in FIGS. 2a, 2b and 2c.

In order to protect the longitudinal bearer 5, which is located within an area exposed to considerable soiling during the driving operation, against these soilings, it is covered off by a guard or shield member generally designated by reference numeral 6 which is connected to the lower edge of the door 2. The shield member 6 abuts sealingly at the longitudinal bearer 5 at least with its lower edge when the door 2 is closed. The longitudinal bearer 5 is set back in all embodiments with respect to the contour of the door 2 in such a manner that the shield member 6 can be so connected to the lower edge of the door 2 that it extends the contour thereof. The shield member 6 and the longitudinal bearer 5 are thereby drawn in with a curvature toward the vehicle center.

In the embodiment according to FIG. 2a, a plate 7 of elastic material, especially of synthetic resinous material of conventional type, serves as a shield member 6 which is secured with a groove provided in a bulge 8 at a flange 9 of the lower door edge. The upper edge 10 of the plate 7 is supported at a shoulder 11 of the door 2 so that a safe retention and mounting is assured. The curvature of the plate 7 is so selected that it possesses a somewhat smaller radius of curvature than the longitudinal bearer 5. It is achieved thereby that the shield member 6 is elastically deformed during the closing of the door 2 so that its lower edge 12 is supported with a certain spring force at the longitudinal bearer 5 during the closing of the door 2. The lower edge 12 of the plate 7 which is thickened bulge-like, is reinforced with an insert 13 of wire or spring material.

In the embodiment according to FIG. 2b, a relatively thick-walled plate 14 is provided as shield member 6 which consists of a yielding material. The plate 14 is reinforced by inserts 15 of elastic material which extend approximately vertically. A circular profile 17 is secured at a lower door fold 16 of the door 2, over which is clipped the plate 14 with a corresponding approximately 3/4 cylindrical aperture. The plate 14 is therefore pivotally secured at the door 2. Whereas it is able to move freely in the direction toward the longitudinal bearer 5 within a relatively large scope, its pivot movements away from the longitudinal bearer 5 are delimited by the upper edge 18 thereof, which abuts at a shoulder 19 of the door 2. The plate 14 which is approximately U-shaped in cross section, abuts with the lower edge thereof sealingly at the longitudinal bearer 5 which is provided with a protective profile 20, which protects both the lower edge as also the longitudinal bearer 5 against damages. An elastic sealing force, with which the lower edge is supported at the longitudinal bearer 5, is obtained during the closing of the door 2 by the deformation of the plate 14. The inserts 15 possess a lower edge angularly bent off corresponding to the lower edge of the plate 14. In their upper edge, they are enlarged fork-shaped so that they also contribute to the fact that the plate 14 is retained safely on the rod 17 serving as pivot shaft.

In the embodiment according to FIG. 2c, the shield member 6 includes a shell-like curved plate 21 of synthetic plastic material or the like which is provided with a circumferential edge bead or bulge 22. The plate 21 which may consist of a slightly elastic relatively stiff material, is surrounded by an elastic profile 23. This profile 23 includes within the upper area of the plate 21 a T-shaped recess 24 by means of which it is clamped on a corresponding flange 25 of the door 2. The profile 23 may additionally be adhesively secured at the flange 25 and the door 2 by gluing, bonding or the like. The lower edge 26 of the elastic profile 23 forms a sealing lip which abuts at the longitudinal bearer 5 and which elastically yields during the closing of the door.

In the embodiment according to FIG. 2c, it is also advantageously provided that the shield member 6 abuts at the longitudinal bearer 5 with a prestress force when the door 2 is closed. This can be achieved in a simple manner by a corresponding configuration of the upper area of the elastic profile 23 which is so constructed that during the closing of the door 2, it has to be elastically deformed in order to assume the illustrated shape and configuration.

In all embodiments the longitudinal bearer 5 which delimits the door opening, is covered off at least within the upper area in such a manner that it is protected against dirt which is sprayed up from below. It will be appropriate in many cases that also at least the forward edge of the shield member 6 is so constructed that it abuts as sealingly as possible at the longitudinal bearer 5 so that it is additionally prevented that the dirt which is stirred up during the drive by the front wheels 3 and is thrown up, can enter into the space between the shield member 6 and the longitudinal bearer 5.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A motor vehicle with at least one door on each vehicle side, a door opening for receiving each door, a longitudinal bearer means delimiting a bottom of each door opening, characterized in that a shield means is provided at each door, said shield means with a closed door covers the longitudinal bearer means at least in its upper area and abuts with its edges at the longitudinal bearer means, the shield means is pivotally mounted at a lower edge of each door, and in that said shield means is stressed with a spring force in the direction toward the longitudinal bearer means.

2. A motor vehicle according to claim 1, characterized in that the shield means consists of an elastic plate to be deformed during the closing of the door.

3. A motor vehicle according to claim 2, characterized in that the shield means is equipped with reinforcing means.

4. A motor vehicle according to claim 3, characterized in that the reinforcing means consists of spring material.

5. A motor vehicle with at least one door on each vehicle side, a door opening for receiving each door, a longitudinal bearer means delimiting a bottom of each door opening, characterized in that a shield means is provided at each door, said shield means with a closed door covers the longitudinal bearer means at least in its upper area and abuts with its edges at the longitudinal bearer means, the shield means is resiliently mounted at a lower edge of each door, the shield means is stressed with a spring force in the direction toward the longitudinal bearer means, the shield means consists of an elastic plate fashioned of a slightly elastic, relatively stiff material, said plate to be deformed during the closing of the door, and a profile means fashioned of a yielding elastic material surrounding said elastic plate and including a lower edge, said elastic plate comprising end means wherein upon the closing of its respective door said profile means abuts at least with the lower edge thereof at the longitudinal bearer means causing said elastic plate to pivot relative to said profile means.

6. A motor vehicle according to claim 5, characterized in that said profile means consists essentially of an elastic material such that said profile means and said elastic plate serve to provide the spring force stressing the shield means toward the longitudinal bearer means, and in that the profile means includes an upper area having a predetermined configuration such that, with a closed door, the shield means abuts at the longitudinal bearer means with a prestressed force.

7. A motor vehicle according to claim 3, characterized in that the longitudinal bearer means is arranged set back with respect to the contour of the door, and in that the shield means continues the configuration of the door.

8. A motor vehicle according to claim 7, characterized in that the vehicle is a passenger motor vehicle.

9. A motor vehicle according to claim 1, characterized in that the shield means is equipped with reinforcing means.

10. A motor vehicle according to claim 9, characterized in that the reinforcing means consists of spring material.

11. A motor vehicle according to claim 1, characterized in that the longitudinal bearer means is arranged set back with respect to the contour of the door, and in that the shield means continues the configuration of the door.

* * * * *